United States Patent [19]

Boda

[11] 4,441,836
[45] Apr. 10, 1984

[54] CABLE CONNECTION
[75] Inventor: James C. Boda, Winneconne, Wis.
[73] Assignee: Brunswick Corporation, Skokie, Ill.
[21] Appl. No.: 414,118
[22] Filed: Sep. 2, 1982
[51] Int. Cl.³ .............................................. F16C 1/14
[52] U.S. Cl. ................... 403/154; 403/316; 403/317; 403/309; 403/322
[58] Field of Search .............. 403/100, 289, 321, 309, 403/322, 154, 316, 317; 24/122.3, 133, 134 KA, 136 R, 243 C

[56] References Cited
U.S. PATENT DOCUMENTS

| 1,769,967 | 7/1930 | Saurman et al. | 403/309 X |
| 2,811,349 | 10/1957 | Bondurant | 403/317 X |
| 3,253,480 | 5/1966 | Fernberg | 308/2 R |
| 3,398,600 | 8/1968 | White et al. | 285/162 X |
| 3,516,299 | 6/1970 | Conrad | 403/122 X |
| 3,860,352 | 1/1975 | Carlson | 403/317 X |

Primary Examiner—Cornelius J. Husar
Assistant Examiner—Joseph A. Fischetti
Attorney, Agent, or Firm—O. T. Sessions

[57] ABSTRACT

A connector for attaching a central core wire (11) of a flexible cable to a control element (13) has a cable guide (15) attached to the core wire (11). A pivot pin (22) extending through a bore in the cable guide (15) is attached to the control element (13) and has an annular groove (23) in one end. A locking body (24) has a cylindrical section (25) reciprocally mounted on the cable guide (15) and an arm (27) extending forward to engage the groove (23) in the pivot pin (22). A notch (29) at the end of the arm (27) snaps around the pivot pin (22) to hold it in place.

5 Claims, 4 Drawing Figures

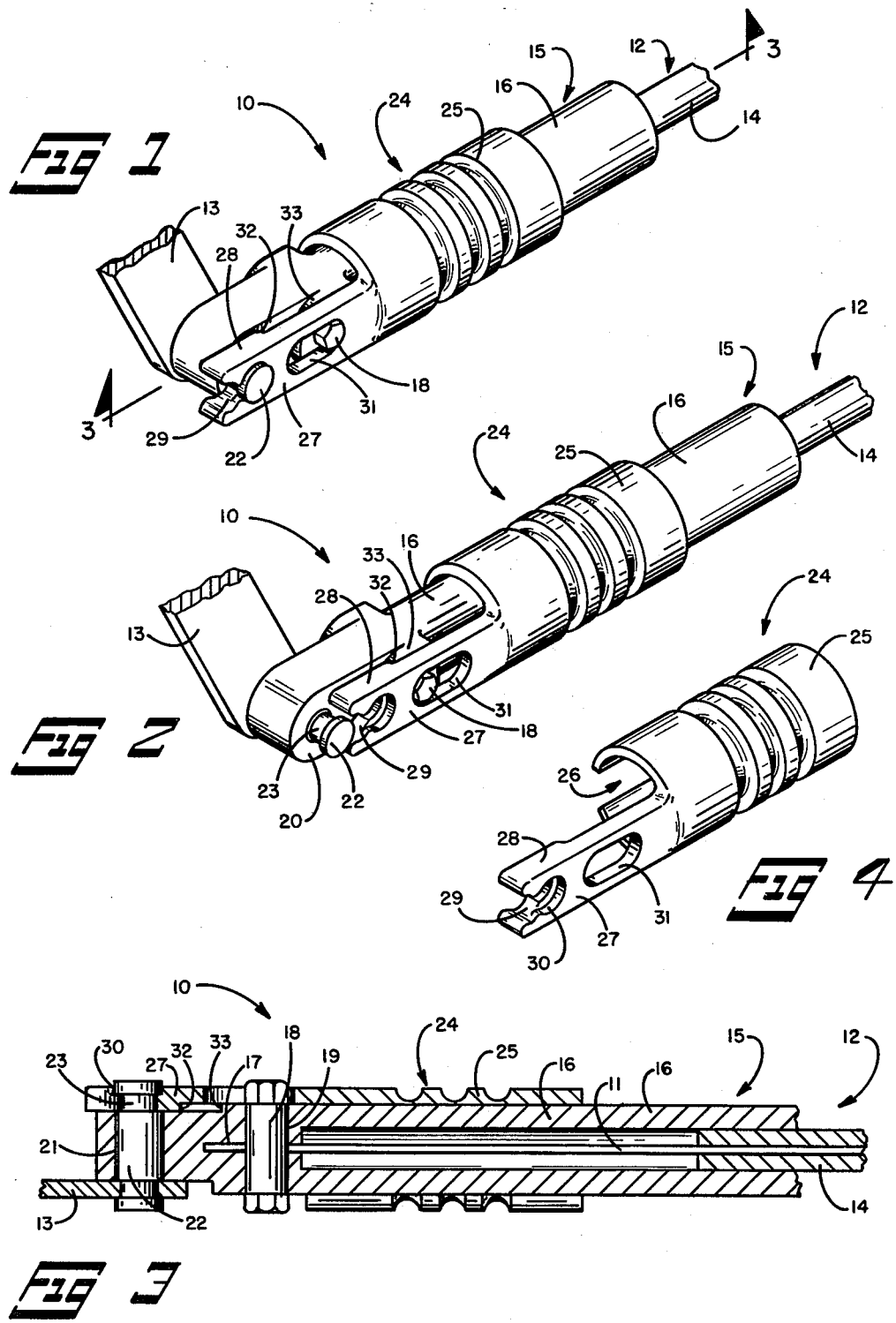

CABLE CONNECTION

DESCRIPTION

1. Technical Field

This invention relates to a connector which is particularly suitable for connecting a flexible cable to a control unit.

2. Background Art

Some prior cable connectors have used cable ends having holes through which pins are placed to connect the cable to a control element. Frequently cotter pins are used to retain the pins in place. Such assemblies are inconvenient, requiring tools for assembly and disassembly. Further, the cotter pins may be lost during installation.

Other connectors, such as those shown in U.S. Pat. No. 3,398,600 to White, et al and U.S. Pat. No. 3,253,480 to Fernberg, use snap attachments. These, however, do not provide as strong an attachment as the assemblies using pins.

DISCLOSURE OF INVENTION

The present invention is directed to a connector for attaching a central core wire to a control element. The connector includes a cylindrical body attached to the flexible cable. The cylindrical body has a hole therethrough extending generally perpendicular to the axis of the cylindrical body. A connecting pin has one end attached to the control element and extends through the hole in the cylindrical body. A shoulder is provided on the pin facing the control element. To prevent removal of the connecting pin from the hole in the cylindrical body, a locking body mounted on the cylindrical body is provided with a surface engageable with the connecting pin shoulder. The invention thus provides a connection having the strength of the pinned connection, but requires no easily lost parts since the locking body is mounted on the cylindrical body.

The locking body can conveniently be reciprocably mounted on the cylindrical body to allow the connecting pin to be locked in place or unlocked by merely sliding the locking body along the cylindrical body.

Providing the locking body with a cylindrical portion mounted around the cylindrical body provides a simple mounting arrangement. By splitting the cylindrical body along the axis and making the cylindrical portion smaller than the diameter of the cylindrical body in its relaxed state, a frictional force can be provided resisting movement of the locking body and retaining it in its locking position.

The connector can further be provided with a first latching element fixed to the cylindrical body and a second latching element included as part of the locking body, with the latching elements coacting to hold the locking body in engagement with the shoulder of the connecting pin. The second latching element is preferably formed as a portion of the locking body which partially encircles the connecting pin to provide a latching action.

An additional feature of the invention is provided by an elongated hole in the cylindrical portion of the locking body and a protrusion from the cylindrical body into the elongated hole. The elongated hole and protrusion serve to limit the reciprocating motion of the locking body.

The invention thus provides a connector which is simple, strong and inexpensive. The connector can be assembled without the use of tools and can readily be connected and disconnected, also without the use of tools.

BRIEF DESCRIPTION OF THE DRAWINGS

FIG. 1 is a perspective view of a connector according to the invention showing the connection locked together.

FIG. 2 is a perspective view of the device of FIG. 1 in the unlocked position.

FIG. 3 is a sectional view of the connector shown in FIG. 1.

FIG. 4 is a perspective view of the locking element illustrated in FIGS. 1 through 3.

BEST MODE FOR CARRYING OUT THE INVENTION

Referring to the drawings, the preferred embodiment of the cable connection of the present invention is shown. The cable connection 10 is required to connect the motion transmitting core element 11 of a flexible cable 12 to a control element 13.

The flexible cable 12 preferably includes a flexible sheath, not illustrated, terminated by a rigid tube 14. A cable guide 15 is affixed to the end of the core element 11 and includes a tubular section 16 which reciprocates over the tube 14 to prevent bending of the free end of the coe element 11. The end of the core element 11 is inserted in a small bore 17 in the end of the cable guide 15 and staked in place by an anchoring element 18 inserted through a cross-bore 19 in the guide 15. The ends of the anchoring element 18 protrude beyond the external surface of the cable guide 15. Terminating the cable guide 15 is an end having flat surfaces 20 on opposite sides and a cross hole 21 therethrough.

A pivot pin 22 is permanently attached to the control element 13, which may be a lever or slide. The pivot pin 22 has an annular groove 23 around its end, for a purpose to be described, and has a diameter slightly smaller than that of the cross hole 21 in the cable guide 15. The pivot pin 22 is inserted in the cross hole 21 to carry the motion transmitting loads between the axially reciprocating core element 11 and the control element 13, with the annular groove 23 extending through the hole 21.

A locking body 24 is mounted on the cable guide 15 to lock the pivot pin 22 in place. The locking body 24 includes a cylindrical section 25, split along its axis as most clearly shown in FIG. 4. The split 26 is as wide as the diameter of the tube 14 to allow the locking body 24 to be placed over the tube 14 and slide forward over the cable guide 15. Preferably the inside diameter of the cylindrical section 25 in its relaxed state is slightly smaller than the outside diameter of the cable guide 15. The gripping action of the locking body 24 on the cable guide 15 thus tends to hold the body 24 in place on the guide 15.

An arm 27, projecting forward from the cylindrical section 25 of the locking body 24, includes a latching element 28 on its end to engage the annular groove 23 in the pivot pin 22 and hold the pin 22 in place. The latching element 28 includes a notch 29 having a circular portion at its base with a diameter approximately equal to the diameter of the groove 23 in the pivot pin 22. The open segment of the circular portion is narrower than the diameter of the annular groove 23 in the pivot pin 22. The notch 29 on the locking body 24 thus will snap onto the annular groove 23 of the pivot pin 22 to hold the locking body 24 in its locking position. With the locking body 24 and the pivot pin 22 so engaged, the edges of the pivot pin groove 23 are engaged by the edges of the locking body notch 29 to prevent axial movement of the pivot pin 22, thereby locking the pivot pin 22 in engagement with the cable guide 15. A counter bore 30 is provided at the outside of the locking body arm 27 to accomodate the end of the pivot pin 22 to further protect it from being pushed out of place. An elongated hole 31 is also provided in the arm 27 projecting from the locking body 24. The arm 27 can be bent during assembly to allow the end of the anchoring element 18 to enter the elongated hole 31.

To limit the axial movement of the locking body 24 once it is in place on the cable guide 15, a shoulder 32 is provided on the inside of the arm 27. The shoulder 32 abuts against another shoulder 33 provided on the cable guide 15 when the locking body 24 is disengaged from the pivot pin 22, thereby preventing inadvertent removal of the locking body 24 from the cable guide 15.

Preferably, the locking body 24 is formed from steel by a stamping operation, though it could also be molded from a plastic material.

I claim:

1. A connector for attaching a central core wire of a flexible cable to a control element, said connector comprising:
   (A) a cylindrical body attached to said flexible cable, said cylindrical body including a hole therethrough, said hole extending generally perpendicular to the axis of said cylinder;
   (B) a connecting pin having one end attached to said control element, said connecting pin extending through said hole in said cylindrical body and having a shoulder facing said control element; and
   (C) a locking body reciprocably mounted on said cylindrical body, said locking body including a generally cylindrical portion mounted around said cylindrical body and having a surface engageable with said shoulder of said connecting pin on the side of said cylindrical body opposite said control element, to prevent removal of said pin from said hole.

2. The connector defined in claim 1 wherein said generally cylindrical portion is split along its axis and wherein said generally cylindrical portion in its relaxed state is smaller than said cylindrical body, whereby said cylindrical portion presses against said cylindrical body to provide a frictional force resisting movement of said locking body.

3. The connector defined in claim 1 wherein said locking body includes axially opposed surfaces and said cylindrical body includes projecting surfaces facing said axially opposed surfaces, the distance between said axially opposed surfaces being greater than between said projecting surfaces to allow limited reciprocation of said locking body.

4. The connector defined in claim 3 wherein said locking body includes a latching portion partially encircling said connecting pin in the engaged position to provide a latching action for latching said locking body to said connecting pin.

5. The connector defined in claim 4 wherein said locking body includes an arm projecting from said cylindrical portion and said latching portion is formed at the end of said arm.

* * * * *